Aug. 4, 1959   T. O. DAVIDSON ET AL   2,897,613
HYDRAULIC CARRYING-LOCK FOR EARTH-WORKING SCRAPERS
Filed April 25, 1956   2 Sheets-Sheet 1

INVENTOR.
TREVOR O. DAVIDSON
GOTTFRIED J. STORATZ

ATTORNEY

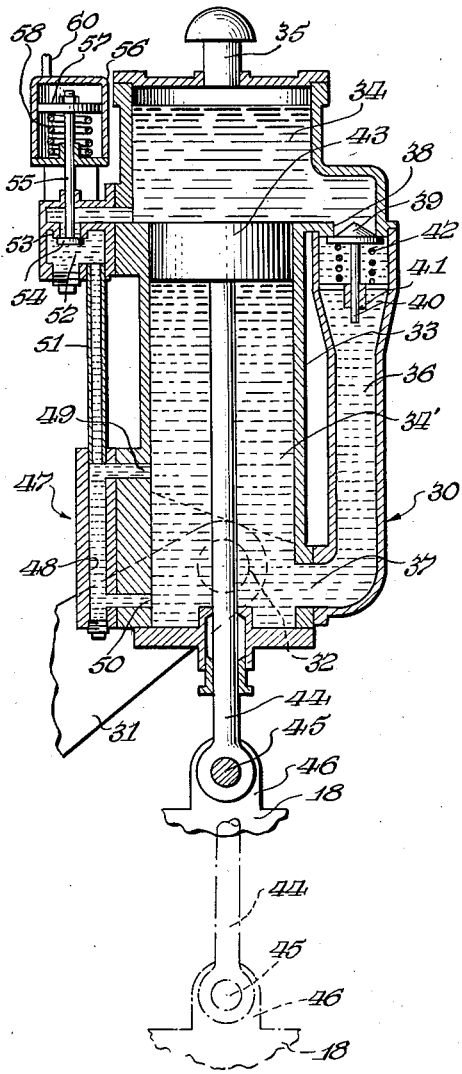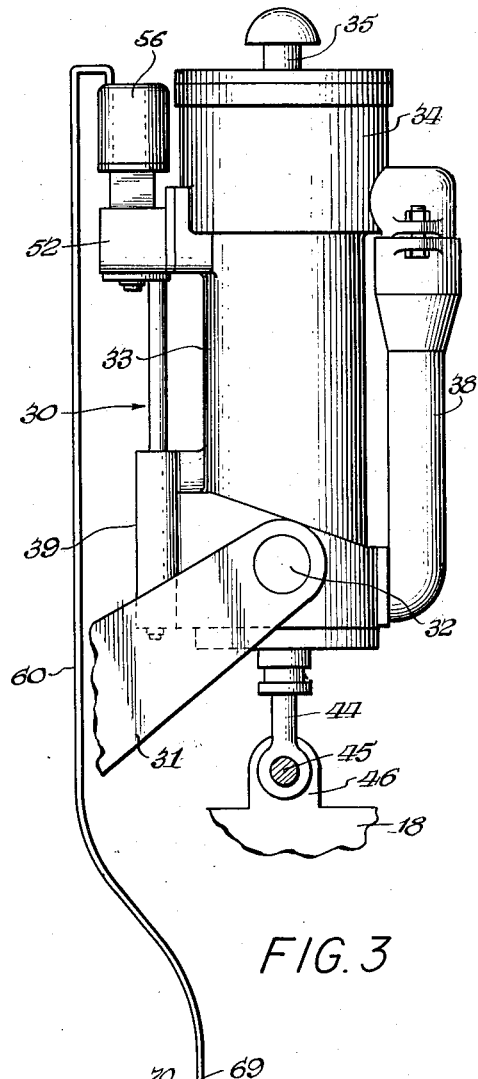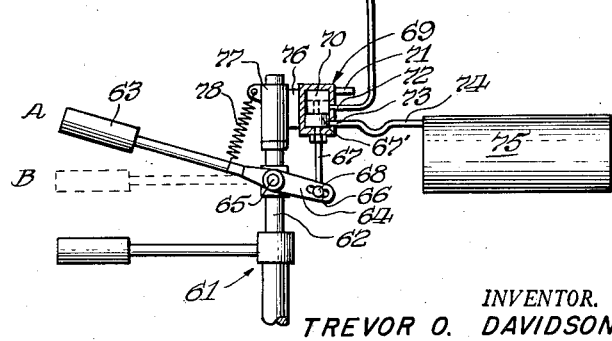
FIG. 2
FIG. 3
INVENTOR.
TREVOR O. DAVIDSON
GOTTFRIED J. STORATZ
ATTORNEY United States Patent Office 2,897,613
Patented Aug. 4, 1959

2,897,613

HYDRAULIC CARRYING-LOCK FOR EARTH-WORKING SCRAPERS

Trevor O. Davidson, Milwaukee, Wis., and Gottfried J. Storatz, Park Ridge, Ill., assignors to International Harvester Company, a corporation of New Jersey Application April 25, 1956, Serial No. 580,627

10 Claims. (Cl. 37—126)

This invention relates to a new improvement in a carrying-lock for earth-moving scrapers. More specifically the invention relates to a safety device to maintain a scraper bowl in a raised or traveling position.

Earth-moving scrapers, which are well known in the art, generally comprise a wheeled frame and a scraper bowl. The wheeled frame may be moved by a two or four wheel tractor and the scraper bowl is generally pivoted on the frame for movement to and from an earth-working position in a vertical direction. The scraper bowl is conventionally provided with a suitable cutting edge and vertical movement of the bowl is effected by means of a winch and cable arrangement controlled by the operator from his seat on the tractor unit. The cable is suitably reeved about various sheaves mounted relative to the tractor and the scraper frame for accomplishing such movement of the bowl. The tractor and the scraper combination which is usually articulated, is extensively used for the gathering and high-speed carrying of large loads of material. Such material may be carried over long distances and it is highly essential that the digging and carrying bowl is securely locked in the carrying position and is prevented from falling in the event that the cables and sheaves fail during the transport operation of the unit. It is of course readily apparent that failure of the cable arrangement, without the provision of an effective lock, can cause serious damage to the equipment and possibly injury to the operator or other persons. Therefore the principal object of this invention is to provide a new and improved fully positive carrying-lock arranged and constructed to securely lock the scraper bowl in a traveling or raised material-carrying position.

A still further object is to provide an improved carrying-lock for scraper bowls arranged to securely lock the bowl in position against falling when the operator removes his hands from the winch control lever of the unit.

A still further object is to provide an improved scraper lock means adapted to lock a scraper bowl in a raised position, the said lock being adapted to permit raising of the bowl in the event that the bottom of the bowl strikes an object during its traveling position thus preventing injury to the bowl and scraper unit.

A still further object is to provide a lock device which will automatically lock a scraper bowl in a raised position when the operator releases his hands from the manual winch control lever, the said unit also permitting free movement of the scraper bowl when the lever is manually controlled to raise or lower the scraper bowl by means of the winch mechanism.

A further object is to provide a control lock for locking a scraper bowl in a raised position, the control lock preventing the bowl from falling under cable failure conditions, the said lock also permitting yielding of the bowl in an upward direction during the encounter of obstructions by the bowl during transport position.

Another object is to provide an improved carrying-lock for scraper bowls which can be easily installed in any conventional earth-moving scraper, the said lock being inexpensive in construction and maintenance.

A still further object is to provide an automatic lock for locking a scraper bowl in a raised position, the lock being constructed and arranged to permit limited upward and lowering movement of the scraper bowl, independently of the lock during the working position of the said bowl.

These and further objects will become more readily apparent from a reading of the specification when examined in connection with the accompanying sheets of drawings.

In the drawing:

Figure 2 is an enlarged cross-sectional view of an automatic carrying-lock cylinder assembly; and Figure 3 is a schematic view showing the interconnection of an operator's control mechanism with an automatic carrying-lock cylinder assembly.

Figure 1:
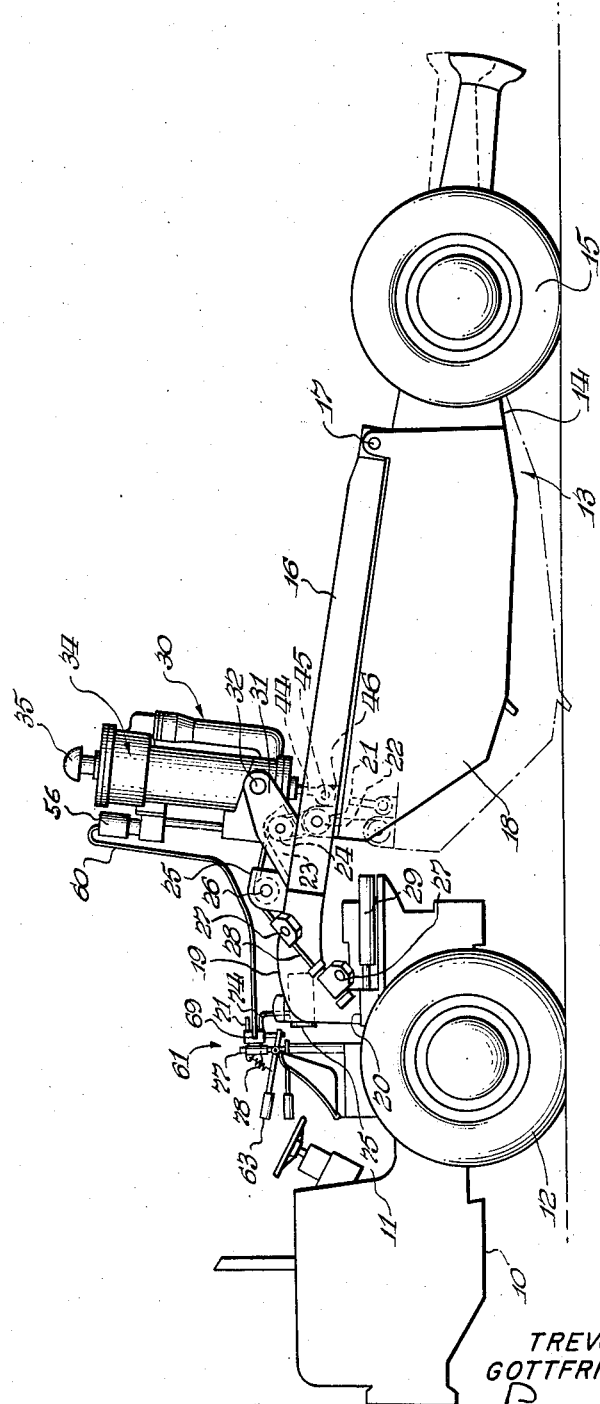
Figure 1 is a side elevational view of a conventional earth-moving tractor and scraper combination showing an improved carrying-lock, the said lock being shown in considerably enlarged relation with respect to its actual relative size, so as to make the relevant features of said lock more easily identifiable.

Referring now particularly to Figure 1 a two wheel tractor is generally designated by the reference character 10. The two wheel tractor comprises an operator's station 11 and ground wheels 12. A scraper of the earth-moving type is generally designated by the reference character 13, the said scraper 13 being positioned in articulated relation with respect to the tractor 10. The scraper 13 comprises a frame 14 supported at its rear upon wheels 15, one of which is shown. The frame 14 is connected to the tractor 10 by means of a supporting member or boom 16 which is hingedly connected, as indicated at 17 to a scraper bowl 18. The boom 16 includes a goose neck portion 19 which is hinged or pivoted as indicated at 20 in conventional fashion to the tractor 10.

A bowl raising and lowering mechanism includes a bracket 21 which is connected to the forward portion of the bowl 18. The bracket 21 has rotatably supported thereon a bowl sheave 22. A bracket 23 supported on the frame 16 also rotatably supports a sheave 24. A bracket 25 is supported on the frame 16 and this bracket 25 in turn rotatably supports a sheave 26. Guide sheaves 27 are suitably supported to direct a cable reeving arrangement 28 from a winch arrangement 29 over the sheaves 26, 24 and 22 in conventional fashion. Details of the reeving arrangement or cable layout 28 have been omitted since a conventional arrangement can be utilized for raising and lowering the bowl 18 from a ground-working to a transport position.

A bowl lock-assembly as shown in Figures 1 through 3 is generally designated by the reference character 30. The lock-assembly 30 includes a bracket 31 which is rigidly attached to the frame or boom 16. The bracket 31 supports a transversely extending pin 32 connected to a casing 33 which is, with the pin 32, free to pivot with respect to the bracket 31.

Referring now particularly to Figures 2 and 3 the casing 33 comprises a reservoir 34 having at its upper end an air vent 35. The casing 33 is further provided with a bypass conduit or chamber 36 having at its lower end a bypass inlet 37. A bypass outlet 38 is provided on the conduit 36, the said outlet 38 being controlled by means of a valve 39. The valve 39 is resiliently supported by means of a stem 40 slidably positioned in a guide 41, the said valve 39 being urged in an upward direction by means of a spring 42 to close off the outlet 38.

A piston 43 is reciprocably positioned within the casing 33. The piston 43 has connected thereto a piston rod 44 adapted to extend outwardly of the casing 33 and being pivotally connected by means of a pin 45 to a bracket 46 which is rigidly secured to a forward upper portion of the bowl 18. The casing 33 further includes a return fluid casing generally designated at 47 and having a passage or chamber 48. The chamber 48 is in communication with a hydraulic cylinder 34' by means of an upper port 49. A lower return port 50 of the chamber 48 communicates with the cylinder 34'. A conduit 51 provides communication between the chamber 48 and a valve chamber 52 having an inlet connection 53. The inlet connection 53 is adapted to be regulated by means of a valve 54 having an upwardly extending stem 55 projecting into an air pressure chamber 56. The stem 55 is connected to a piston 57. A spring 58 acting against the piston 57 normally urges the valve 54 to close the inlet connection 53. A conduit 60 communicates with the pressure chamber 56, the said conduit 60 extending to an operator's control means or control assembly generally designated by the reference character 61.

The control assembly 61, as shown in Figures 1 and 3, comprises a control shaft 62 adapted to control the winch 29 for raising and lowering the bowl 18 as desired. A handle or control member 63 is connected to the control shaft 62 of the operator's control means and upon rotation of the handle 63 control of the winch 29 is effected. One end of handle 63 is provided with an extension 64 which is connected to the control shaft 62 by means of a pivot pin 65. The extension 64 is provided at one end with a slot 66. A rod 67 is provided at its lower end with a pivot portion 68 disposed in sliding and relatively pivotal relation within the slot 66.

The rod 67 extends into a control valve means or air valve assembly generally designated at 69. The air valve assembly 69 comprises a chamber 70 having an exhaust port 71. The chamber 70 is also provided with a pressure port 72 to which the flexible conduit 60 is connected. Furthermore the chamber 70 includes an inlet port 73 communicating, by means of a flexible conduit 74, with a reservoir 75 suitably positioned on the tractor 10 as indicated in Figure 1. The air valve assembly 69 is suitably supported by means of a bracket 76 on a sleeve 77. The sleeve 77 is fixed on the control shaft 62 against relative vertical movement but is suitably keyed to the said shaft to rotate about a vertical axis therewith during operation of the said control shaft 62 for raising and lowering the bowl 18. A spring 78 connected to the sleeve 77 and to the handle 63 maintains the handle 63 normally in the solid line position shown in Figure 3. As indicated in Figure 3 the rod 67 is provided at its upper end with a piston 67' adapted to reciprocate within the chamber 70.

The operation of the hydraulic lock assembly in connection with the tractor and scraper unit will now be described. In the full line position of the bowl shown in Figure 1 the bowl is in a transport or load-carrying position. In this position it is extremely desirable that the bowl remain locked against falling in the event of failure of the winch or cable reeving arrangement. In this position the lock assembly 30 functions or is arranged as indicated in Figure 2. It is obvious that the piston 43 is maintained against downward movement by the fluid contained within the fluid cylinder 34'. The bypass conduit 36 is closed by virtue of the check valve 39 which has closed off the bypass outlet 38. Likewise the fluid inlet 53 is locked or closed against the entrance or exit of fluid from the valve chamber 52 and thus it is obvious that a secure hydraulic lock is effective which maintains the bowl in the transport position and assures the same against falling in the event of winch or cable failure. In this transport position the handle 63 is also as indicated in the full line or position A of Figure 3.

In the full line position of the handle 63, as indicated in Figure 3, it is apparent that the piston 67' is directly over the inlet port 73 which is thus closed with respect to the conduit 60 extending to the air pressure chamber 56.

The locking action of the hydraulic cylinder has thus been described. It is of course obvious that the hydraulic lock must function or be synchronized properly with the cable control mechanism so that it is released from locking action during lowering of the bowl 18 to its various lowered or working positions. As the operator lowers the bowl by moving the control shaft 62 he moves the handle 63 downwardly into the dotted line position B shown in Figure 2. The rod 67 and piston 67' are thereupon moved upwardly within the chamber 70 closing off the exhaust port 71. The air reservoir 75 is now in communication with the chamber 70 by means of the conduit 74 and the pressure port 72 directs air under pressure through the conduit 60 into the pressure chamber 56. The piston 57 is now moved downwardly opening the valve 54. Thus as the bowl 18 is being lowered by the winch and cable assembly the piston 43 is now free to move downwardly and fluid within the chamber 34' is directed through the conduit 51 through the inlet port 53 into the reservoir 34. Thus it is apparent that simultaneously with the lowering of the bowl the hydraulic lock 30 is released to permit such lowering movement. Control for the lowering of the bowl is effectuated by the handle 63 which simultaneously unlocks the hydraulic lock present in the lock assembly. Thus whenever the operator pushes downwardly on the handle 63, during downward movement of the bowl, the hydraulic lock is released. Likewise when he releases the handle 63 the spring 78 will pivot the handle 63 upwardly again forcing the piston 67' downwardly to its lowermost position in the chamber 70 whereupon it closes the pressure inlet port 73 and air is exhausted from the conduit 60 through the exhaust port 71.

During the lowered position of the bowl, when the bowl has been lowered to the ground surface level or below during digging operations, it is desirable for the operator to control the scraper blade level solely by the winch irrespective of the hydraulic lock-assembly. Thus when the bowl is lowered a sufficient amount so that the piston 43 moves below the top port 49 and above the lower port 50, it is obvious that winch control independent of the lock-assembly is effected since liquid above and below the piston, in this position, can bypass freely through the ports 49, 50 and chamber 48.

As indicated in the objects, it is also highly desirable that the scraper bowl, when locked against downward movement in a transport position, be free to move upwardly in an unrestricted manner in the event the bowl should strike an obstruction tending to push the bowl upwardly. This relatively unrestricted upward movement of the bowl is readily effected despite it being locked against downward movement. In such an occurrence the piston 43 of course is moved upwardly and liquid in the reservoir 34 is forced through the bypass outlet 38, the valve 39 being forced to open by the vacuum or suction created as the piston is moved upwardly within the fluid chamber 34'. Thus the upward movement of the piston is relatively unrestricted should the bowl encounter such an obstruction during transportation.

Thus it is readily apparent that the hydraulic lock-assembly is substantially automatic during winch control of the scraper bowl and that the bowl is effectually locked during a transport position. Furthermore, the hydraulic lock-assembly is effective to permit relatively unrestricted upward movement of the bowl during certain conditions and is in effect non-operative during the lowered or digging position of the bowl at a time when it is desirable that the operator have complete control of the winch apart from the hydraulic lock-assembly.

Thus the objects of the invention have been fully achieved and it must be understood that changes and modifications may be made without departing from the spirit of the invention or the scope thereof as defined in the appended claims.

What is claimed is:

1. In a wheeled scraper having a frame, a scraper bowl supported on said frame for relative movement from a lowered to a raised position, raising and lowering mechanism on said frame and connected to said bowl, and operator's control means connected to said raising and lowering mechanism; a lock assembly for said scraper bowl comprising, a fluid extensible device including a fluid casing pivotally mounted on said frame, a fluid cylinder in said casing, a fluid reservoir in said casing, a piston movably positioned in said cylinder, a piston rod connected to said piston, means pivotally connecting said rod to said scraper bowl, a first bypass conduit adapted to provide for communication between said reservoir and said fluid cylinder, a check valve in said conduit adapted to permit the flow of fluid from said reservoir to said fluid cylinder during movement of said piston toward said reservoir in response to upward movement of said bowl, a fluid return conduit communicating with said fluid cylinder and said reservoir, a pressure operated valve associated with said fluid return conduit adapted to open said return conduit to permit the flow of fluid between said cylinder and said reservoir during the open position of said pressure operated valve whereby said piston is free to move relative to said fluid cylinder in response to movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, a control member connected to said control valve means and to said operator's control means, said control member being movable for opening the control valve means to direct fluid to said pressure operated valve to open the same during simultaneous actuation of said operator's control means to lower said bowl, and a second fluid bypass conduit having openings communicating with said fluid cylinder on opposite sides of said piston during a lowered working position of said bowl to permit the free bypass of fluid between portions of said fluid cylinder above and below said piston, said pressure operated valve and said check valve being closed when said bowl is raised to a position above said working position wherein said piston is locked in said fluid cylinder against movement tending to lower said bowl during inaction of said raising and lowering mechanism.

2. In a wheeled scraper having a frame, a scraper bowl supported on said frame for relative movement between a lowered working position and a raised position, raising and lowering mechanism connected to said frame and to said bowl, and operator's control means connected to said raising and lowering mechanism; a lock assembly for said scraper bowl comprising, a fluid extensible device including a fluid casing supported by said frame, a fluid cylinder in said casing, a fluid reservoir in said casing, a piston movably positioned in said cylinder, a piston rod connected to said piston, means connecting said rod to said scraper bowl, a first bypass conduit adapted to provide for communication between said reservoir and said fluid cylinder, a check valve in said conduit adapted to permit the flow of fluid from said reservoir to said fluid cylinder during movement of said piston toward said reservoir in response to upward movement of said bowl, a fluid return conduit adapted to provide communication between said fluid cylinder and said reservoir, a pressure operated valve associated with said fluid return conduit adapted to open said return conduit to permit the flow of fluid between said cylinder and said reservoir during the open position of said pressure operated valve whereby said piston is free to move relative to said fluid cylinder in response to lowering movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, a control member connected to said control valve means and to said operator's control means, said control member being movable for opening the control valve means to direct fluid to said pressure operated valve to open the same during simultaneous actuation of said operator's control means to lower said bowl, and a second fluid bypass conduit having openings communicating with said fluid cylinder on opposite sides of said piston during a lowered working position of said bowl to permit the free bypass of fluid between portions of said fluid cylinder above and below said piston, said pressure operated valve and said check valve being closed when said bowl is raised to a position above said working position wherein said piston is locked in said fluid cylinder against movement tending to lower said bowl during inaction of said raising and lowering mechanism.

3. In a wheeled scraper, a frame, a scraper bowl supported on said frame for relative movement from a lowered working position to a raised position, raising and lowering mechanism associated with said frame and said bowl, and operator's control means connected to said raising and lowering mechanism; a lock assembly for said scraper bowl comprising, a fluid extensible device including a fluid casing supported by said frame, a fluid cylinder in said casing, a fluid reservoir in said casing, a piston movably positioned in said cylinder, a piston rod connected to said piston, means connecting said rod to said scraper bowl, a bypass conduit adapted to provide for communication between said reservoir and said fluid cylinder, a check valve in said bypass conduit adapted to permit the flow of fluid from said reservoir to said fluid cylinder during movement of said piston toward said reservoir in response to upward movement of said bowl, a fluid return conduit communicating with said fluid cylinder and said reservoir, a pressure operated valve associated with said fluid return conduit adapted to open said return conduit to permit the flow of fluid from said cylinder to said reservoir during the open position of said pressure operated valve whereby said piston is free to move relative to said fluid cylinder in response to movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, and a control member connected to said control valve means and to said operator's control means, said control member being movable for opening the control valve means to direct fluid to said pressure operated valve to open the same during simultaneous actuation of said operator's control means to lower said bowl, said pressure operated valve and said check valve being closed when said bowl is raised to a position above said working position wherein said piston is locked in said fluid cylinder against movement tending to lower said bowl during inaction of said raising and lowering mechanism.

4. In a wheeled scraper, a frame, a scraper bowl supported on said frame for relative movement from a lowered to a raised position, raising and lowering mechanism associated with said frame and said bowl, and operator's control means connected to said raising and lowering mechanism; a lock assembly for said scraper bowl comprising, a fluid casing associated with said frame, a fluid cylinder in said casing, a fluid reservoir in said casing, a piston movably positioned in said cylinder, a piston rod connected to said piston, means connecting said rod to said scraper bowl, a fluid return conduit communicating with said fluid cylinder and said reservoir, a pressure operated valve associated with said fluid return conduit adapted to open said return conduit to permit the flow of fluid between said cylinder and said reservoir during the open position of said pressure operated valve whereby said piston is free to move relative to said fluid cylinder in response to lowering movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, a control member connected to said control valve means and to said operator's control means, said control member being movable for opening the control valve means to direct fluid to said pressure operated valve to open the same during simultaneous actuation of said operator's control means to lower said bowl, and a fluid bypass conduit having ports communicating with said fluid cylinder on opposite sides of said piston during a lowered working position of said bowl to permit the free bypass of fluid between portions of said fluid cylinder above and below said piston, said pressure operated valve being closed when said bowl is raised to a position above said lowered working position wherein said piston is locked in said fluid cylinder against movement tending to lower said bowl during inaction of said raising and lowering mechanism.

5. In a wheeled scraper, a frame, a scraper bowl supported on said frame for relative movement from a lowered working to a raised position, raising and lowering mechanism associated with said frame and said bowl, and operator's control means connected to said raising and lowering mechanism; a lock assembly for said scraper bowl comprising, a fluid casing supported by said frame, a fluid cylinder in said casing, a fluid reservoir in said casing, a piston movably positioned in said cylinder, a piston rod connected to said piston, means connecting said rod to said scraper bowl, a fluid return conduit communicating with said fluid cylinder and said reservoir, a pressure operated valve associated with said fluid return conduit adapted to open said return conduit to permit the flow of fluid between said cylinder and said reservoir during the open position of said pressure operated valve whereby said piston is free to move relative to said fluid cylinder in response to lowering movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, and a control member connected to said control valve means and to said operator's control means, said control member being movable for opening the control valve means to direct fluid to said pressure operated valve to open the same during simultaneous actuation of said operator's control means to lower said bowl, said pressure operated valve being closed when said bowl is raised to a position above said working position wherein said piston is locked in said fluid cylinder against movement tending to lower said bowl during inaction of said raising and lowering mechanism.

6. In a wheeled scraper, a frame, a scraper bowl supported on said frame for relative movement from a lowered working position to a raised transport position, raising and lowering mechanism associated with said frame and said bowl, and operator's control means connected to said raising and lowering mechanism; a lock assembly for said scraper bowl comprising, a fluid casing pivotally mounted on said frame, a fluid cylinder associated with said casing, a fluid reservoir associated with said casing, a piston movably positioned in said cylinder, a piston rod connected to said piston, means connecting said rod to said scraper bowl, a first bypass conduit adapted to provide for communication between said reservoir and said fluid cylinder, a check valve in said conduit adapted to permit the flow of fluid from said reservoir to said fluid cylinder during movement of said piston toward said reservoir in response to upward movement of said bowl, a fluid return conduit communicating with said fluid cylinder and said reservoir, a pressure operated valve associated with said fluid return conduit adapted to open said return conduit to permit the flow of fluid between said cylinder to said reservoir during the open position of said pressure operated valve whereby said piston is free to move relative to said fluid cylinder in response to lowering movement of said bowl, means controlling said pressure operated valve comprising a fluid pressure chamber having pressure operated means for actuating said pressure operated valve, a source of fluid under pressure adapted to supply pressure to said fluid pressure chamber, control valve means adapted to control the flow of fluid under pressure from said fluid pressure source to said pressure chamber for actuating said pressure operated valve, and a control member connected to said control valve means, said control member being movable for opening the control valve means to direct fluid to said pressure operated valve to open the same during lowering of said bowl, said pressure operated valve being closed when said bowl is raised to a position above said working position wherein said piston is locked in said fluid cylinder against movement tending to lower said bowl during inaction of said raising and lowering mechanism.

7. In an earth-working scraper device including a frame, a bowl carried on said frame for relative movement between ground working and raised positions, and means on said frame and connected to said bowl for raising and lowering the same; a locking unit for said bowl comprising a fluid cylinder carried by said frame, an extensible member connected to said bowl, a piston on said extensible member positioned for reciprocation in said fluid cylinder, a fluid reservoir in said locking unit, a fluid bypass chamber adapted to communicate with said reservoir and said fluid cylinder, a check valve in said bypass chamber adapted to permit fluid from said reservoir to flow to said fluid chamber, a fluid return conduit connected to said reservoir and to said fluid cylinder, a pressure responsive valve in said return conduit, a bypass conduit having ports adapted to communicate with said fluid cylinder on opposite sides of said piston and to bypass fluid freely between portions of said fluid cylinder above and below said piston during limited movement of said bowl when in a lowered working position, said valves being normally closed to lock said piston and maintain said bowl in a position above said working position, said check valve being opened during movement of said piston upwardly in response to raising of said bowl, a source of fluid under pressure adapted to communicate with said return conduit for actuating said pressure responsive valve, and control valve means for regulating the flow of fluid to said return conduit to open said pressure responsive valve simultaneously with the lowering of said bowl to permit movement of fluid from said fluid cylinder to said reservoir whereby said piston is unlocked.

8. In an earth-working scraper device including a frame, a bowl carried on said frame for relative movement between lowered ground working and raised transport positions, and means on said frame and connected to said bowl for raising and lowering the same; a locking unit for said bowl comprising a fluid cylinder associated with said frame, an extensible member connected to said bowl, a piston on said extensible member positioned for reciprocation in said fluid cylinder, a fluid reservoir associated with said fluid cylinder, a fluid bypass chamber adapted to communicate with said reservoir and said fluid cylinder, a check valve in said bypass chamber adapted to permit fluid from said reservoir to flow to said fluid chamber, a fluid return conduit connected to said reservoir and to said fluid cylinder, a pressure responsive valve in said return conduit, said valves being normally closed to lock said bowl in a position above the working position, said check valve being opened during movement of said piston upwardly in response to raising of said bowl, a source of fluid under pressure adapted to communicate with said return conduit to actuate said pressure responsive valve, and a control means connected to the bowl raising and lowering means said control means including a control valve adapted to regulate the flow of fluid to said return conduit for opening said pressure responsive valve simultaneously with the lowering of said bowl to permit movement of fluid from said fluid cylinder to said reservoir.

9. In an earth-working scraper device including a frame, a bowl carried on said frame for relative movement between lowered ground working and raised transport positions, and means on said frame and connected to said bowl for raising and lowering the same, a locking unit for said bowl comprising a fluid cylinder carried by said frame, an extensible member connected to said bowl, a piston on said extensible member positioned for reciprocation in said fluid cylinder, a fluid reservoir associated with said fluid cylinder, a fluid return conduit connected to said reservoir and to said fluid cylinder, a pressure responsive valve in said return conduit, a bypass conduit having ports adapted to communicate with said fluid cylinder on opposite sides of said piston and to bypass fluid freely between portions of said fluid cylinder above and below said piston during movement of said bowl in the lowered working position, said valve being normally closed to lock said bowl in a position above said working position, a source of fluid under pressure adapted to communicate with said return conduit to actuate said pressure responsive valve and control means connected to the bowl raising and lowering means, said control means including a control valve adapted to regulate the flow of fluid to said return conduit for opening said pressure responsive valve simultaneously with the lowering of said bowl to permit movement of fluid from said fluid cylinder to said reservoir.

10. In an earth-working scraper device including a frame, a bowl carried on said frame for relative movement between lowered ground working and raised transport positions, and means on said frame and connected to said bowl for raising and lowering the same; a locking unit for said bowl comprising fluid cylinder associated with said frame, an extensible member connected to said bowl, a piston on said extensible member positioned for reciprocation in said fluid cylinder, a fluid reservoir associated with said fluid cylinder, a fluid conduit connected to said reservoir and to said fluid cylinder, a valve associated with said fluid conduit, said valve being normally closed to lock said piston and to lock said bowl in a position above said working position, a source of fluid under pressure adapted to communicate with said conduit for actuating said valve and control means connected to said bowl raising and lowering means, said control means including a control valve adapted to regulate the flow of fluid to said conduit for opening said valve simultaneously with the lowering of said bowl to permit movement of fluid from said fluid cylinder to said reservoir thereby unlocking said piston.

References Cited in the file of this patent
UNITED STATES PATENTS

| | | |
|---|---|---|
| 2,228,865 | Bird | Jan. 14, 1941 |
| 2,492,049 | Krone et al. | Dec. 20, 1949 |
| 2,572,339 | Helm | Oct. 23, 1951 |
| 2,773,320 | Fryer et al. | Dec. 11, 1956 |